United States Patent
Ilic

(10) Patent No.: US 7,130,760 B2
(45) Date of Patent: Oct. 31, 2006

(54) REPORTING INVALID PARAMETER VALUES FOR A PARAMETER-BASED SYSTEM

(75) Inventor: Kosta Ilic, Austin, TX (US)

(73) Assignee: National Instruments Corporation, Austin, TX (US)

(*) Notice: Subject to any disclaimer, the term of this patent is extended or adjusted under 35 U.S.C. 154(b) by 170 days.

(21) Appl. No.: 10/403,969

(22) Filed: Mar. 31, 2003

(65) Prior Publication Data

US 2005/0075831 A1 Apr. 7, 2005

(51) Int. Cl.
G06F 19/00 (2006.01)
(52) U.S. Cl. .................. 702/176; 702/182; 702/183; 702/184; 702/185; 702/186; 702/187; 702/188; 700/110; 715/764; 715/765
(58) Field of Classification Search .............. 702/1, 702/57, 79, 189, 182–188, 179; 700/174, 700/12, 32, 110; 715/764, 765
See application file for complete search history.

(56) References Cited

U.S. PATENT DOCUMENTS

| | | | |
|---|---|---|---|
| 6,256,625 B1 * | 7/2001 | Breyer et al. | 707/3 |
| 6,647,342 B1 * | 11/2003 | Iglesia et al. | 702/22 |
| 6,666,049 B1 * | 12/2003 | Katende et al. | 62/656 |
| 2003/0036868 A1 * | 2/2003 | Yutkowitz | 702/105 |
| 2003/0095144 A1 * | 5/2003 | Trevino et al. | 345/764 |
| 2004/0002782 A1 * | 1/2004 | Champion et al. | 700/94 |
| 2004/0153245 A1 * | 8/2004 | Womer et al. | 702/9 |

* cited by examiner

*Primary Examiner*—Marc S. Hoff
*Assistant Examiner*—Phuong Huynh
(74) *Attorney, Agent, or Firm*—Meyertons Hood Kivlin Kowert & Goetzel, P.C.; Jeffrey C. Hood; Mark S. Williams

(57) ABSTRACT

System and method for reporting invalid parameter values for a system. An invalid value of a parameter is detected, and information related to the detection determined, including one or more valid values for the parameter, and optionally, an identifier (ID) of the parameter, the invalid value of the parameter, and/or contextual information related to the detection, e.g., a function ID and/or device ID indicating where the detection occurred, an error ID corresponding to the detection, a time value indicating when the detection occurred, and/or a text description of the error and/or parameter. The detection of the invalid value of the parameter is reported, optionally including some or all of the determined information, and the valid values for the parameter displayed. Input, e.g., user input, may optionally be received specifying a new valid value for the parameter, and the parameter set to the specified value.

24 Claims, 7 Drawing Sheets

REPORTING INVALID PARAMETER VALUES FOR A PARAMETER-BASED SYSTEM

FIELD OF THE INVENTION

The present invention relates to the fields of simulation, measurement and automation, and more particularly to a system and method for validating and correcting invalid data in a simulation, measurement or automation system.

DESCRIPTION OF THE RELATED ART

Scientists and engineers often use simulation, measurement or automation systems to perform a variety of functions, including measurement of a physical phenomena or unit under test (UUT), test and analysis of physical phenomena, simulation, rapid control prototyping, hardware-in-the-loop testing, process monitoring and control, monitoring and control of mechanical or electrical machinery, data logging, laboratory research, and analytical chemistry, to name a few examples. The term "measurement system" is intended to refer generally to data and image acquisition systems, including systems which perform rapid control prototyping and hardware-in-the-loop testing. The term "automation system" is intended to refer generally to industrial automation and control systems. Although the system below is described as a measurement system, it is noted that the description also applies to an automation system.

A typical measurement system comprises a computer system with a measurement device or measurement hardware. The measurement device may be or include a computer-based instrument, a data acquisition device or board, a programmable logic device (PLD), a sensor, a smart sensor, an actuator, or other type of device for acquiring or generating data. The measurement device may be a card or board plugged into one of the I/O slots of the computer system, or a card or board plugged into a chassis, or an external device. For example, in a common measurement system configuration, the measurement hardware is coupled to the computer system via other means such as through a VXI (VME eXtensions for Instrumentation) bus, a PXI (PCI eXtensions for Instrumentation) bus, a GPIB (General Purpose Interface Bus), a serial port, or parallel port of the computer system. Optionally, the measurement system includes signal conditioning devices which receive the field signals and condition the signals to be acquired. A measurement system may also typically include transducers, sensors, actuators or other detecting (or generating) means for providing "field" electrical signals representing a process, physical phenomena, equipment being monitored or measured, etc. The field signals are provided to the measurement hardware.

The measurement hardware is configured and controlled by measurement software executing on the computer system. The measurement software for configuring and controlling the measurement system typically comprises two portions: the device interface or driver-level software and the application software, or the application. The driver-level software serves to interface the measurement hardware to the application. The driver-level software may be supplied by the manufacturer of the measurement hardware or by some other third party software vendor. An example of measurement or DAQ driver-level software is NI-DAQ from National Instruments Corporation. The application or client is typically developed by the user of the measurement system and is tailored to the particular function which the user intends the measurement system to perform. The measurement hardware manufacturer or third party software vendor sometimes supplies the application software for certain applications which are common, generic or straightforward.

Oftentimes during the development of a measurement system, or even during field operations, a parameter may be set to an invalid value. Many development systems and programs include functionality for detecting and reporting such errors. Such error reports typically display a very limited amount of information related to the detection. For example, the information displayed may range from a cryptic error code (e.g., Error—1003), to the name of the parameter and possibly where in the program (e.g., a function name and/or program line number, instrument or device, etc.) the detection occurred. The user or developer may then have to refer to one or more technical manuals or references, or technical support, to determine the specific nature of the error and what appropriate action to take to remedy the problem, resulting in decreased productivity and increased frustration on the part of the user or developer.

Thus, improved systems and methods for reporting invalid parameter values are desired.

SUMMARY OF THE INVENTION

Various embodiments of a system and method for reporting invalid parameter values, and optionally correcting the values are presented. Embodiments of the invention may be particularly useful in simulation, measurement and automation systems. It is noted that various embodiments of the method described herein may be implemented in a graphical programming language, such as the LabVIEW graphical program provided by National Instruments Corporation, in a textual programming language, such as C or Visual Basic, Java (e.g., compilable or interpretable), or a combination of both.

In one embodiment, an invalid value of a parameter may be detected, e.g., during the execution of an application program. For example, a parameter used by a textual or graphical program, optionally in conjunction with a device, such as a measurement, automation, and/or control device, may have a value that is outside a specified allowable range, or is otherwise invalid. It is noted that the parameter values may be numeric, alphanumeric, enumerations, or any other type of parameter value.

Once the invalid parameter value is detected, information related to the detection may be determined, including one or more valid values for the parameter. It should be noted that in general the valid values for the parameter must be known by the system in order to detect the invalid parameter value, and so may not have to be determined in a separate step. In other words, the determination of the valid values may be considered to be performed as part of the detection described above, or may simply involve extracting the values from a data structure used in the detection.

In one embodiment, the information related to the detection may also include one or more of: an identifier (ID) of the parameter, such as a mnemonic name or ID number, the invalid value of the parameter, and contextual information related to the detection. In one embodiment, the contextual information may include one or more of: a function ID (e.g., a function name or other identifier) indicating where the detection occurred, a device ID (e.g., a name or other identifier) indicating where the detection occurred, a time value indicating when the detection occurred, and a text description of the parameter, among others. In other words, the contextual information may include any information related to the detection that may be useful to a developer or user in correcting the error.

The detection of the invalid value of the parameter may then be reported, and one or more valid parameter values displayed, where the displayed one or more valid values for the parameter are usable to set the parameter to a valid value. For example, a dialog box (or multiple dialog boxes) may be displayed indicating various details related to the detection, including the determined valid parameter values. As noted above, the parameter values may be numeric, alphanumeric, enumerations, or any other type of parameter value. The one or more valid values for the parameter may be presented in various ways. For example, the valid values may be presented as a list of values or as a range (or multiple allowable ranges) of values.

In one embodiment, reporting the detection of the invalid value of the parameter may include reporting at least a portion of the determined information related to the detection, e.g., one or more of: an identifier (ID) of the parameter, the invalid value of the parameter, and contextual information related to the detection, as indicated above. As also mentioned above, the contextual information may include any information related to the detection that may be useful to the user or developer, including one or more of: a function ID indicating where the detection occurred, a device ID indicating where the detection occurred, a time value indicating when the detection occurred, and a text description of the parameter, among others.

In one embodiment, reporting the detection may include displaying at least a portion of the determined information related to the detection (including the one or more valid parameter values) on a display device, such as, for example, a computer monitor, printer, or other display device.

In another embodiment, reporting the detection of the invalid value of the parameter may include logging at least a portion of the information related to the detection. For example, logging at least a portion of the information related to the detection may include storing said at least a portion of the information related to the detection on a storage medium, and/or and sending said at least a portion of the information related to the detection to an external system over a network.

In one embodiment, input specifying a new value of the parameter may optionally be received, where the new value is preferably one of the one or more valid values for the parameter, and the parameter set to the new value in response to the input. In other words, in some embodiments, the method may include receiving input indicating a valid value for the parameter, and programmatically setting the parameter to the valid value.

The input may be received in a variety of ways from a variety of sources. For example, in one embodiment, the input may be from an external system, such as from a computer or other device via a network. Alternatively, the input may be received from a sub-system of the measurement system, for example, from a program function or, in the case that the application is a graphical program, from a graphical program element, e.g., a node. For example, if the parameter is associated with a graphical program node in the graphical program, the graphical program node may be coupled to (e.g., "wired to") another graphical program element that may export the value of the parameter to the graphical program node. In response to the reported invalid parameter value, the user may edit or other modify the graphical program element (or related programming code) such that a valid value of the parameter will be exported to the graphical program node.

In other embodiments, the input may comprise user input. In various embodiments, the user may invoke presentation of a data field (i.e., a text or numeric entry field), e.g., via a menu, right-clicking on the display, etc., where the data field is operable to receive user input specifying a replacement value for the parameter. User input may then be received by the data field specifying the new value for the parameter. In an embodiment where the application is a graphical program, for example, the user may right-click on a property node (or its equivalent), thereby invoking a selection or input mechanism, such as a list, data field, menu, etc., and specify the value of the parameter. The parameter may then be set to the specified value.

Alternatively, the display of the one or more valid parameter values may include one or more active controls, e.g., entry fields, radio buttons, selectable lists, etc., displayed in a dialog box or panel allowing the user to specify the valid value by interacting with the display. In other words, receiving user input specifying the new value of the parameter may include receiving user input selecting the new value from the displayed one or more valid values for the parameter. In response to the user selection of the valid value, the parameter may be set to that value.

In one embodiment, once the user (or other input source) has specified the replacement value for the parameter, the method may determine whether the new value is a valid parameter value. If the new value is invalid, the method may repeat, proceeding as described above, until a valid parameter value is specified, and the parameter set to that value.

Example measurement system applications where the method may be used include instrumentation systems, telecommunication systems, machine vision systems, control design, control analysis, simulation and modeling, and any other measurement, e.g., data acquisition, or automation, e.g., control, application where it is desirable to validate parameters from a user. For example, embodiments of the present invention are contemplated for use with distributed I/O modules for process automation, including measurement, industrial control, and/or data logging applications which involve diverse arrays of sensors and actuators located centrally or spread over large distances, image acquisition devices, motion controllers, and industrial communications boards, e.g., such as used in manufacturing and storage, among other applications. Other applications where the method of the present invention may be used include analysis related to financial data, stock data, futures data, business data, scientific data, medical data, insurance data, musical data, and biometric data, among others.

Thus, various embodiments of the method described above may operate to report invalid parameter values for a measurement system, presenting valid values of the parameter, and may optionally provide means for setting the parameter to a specified valid value.

BRIEF DESCRIPTION OF THE DRAWINGS

A better understanding of the present invention can be obtained when the following detailed description of the preferred embodiment is considered in conjunction with the following drawings, in which.

Figure 1:
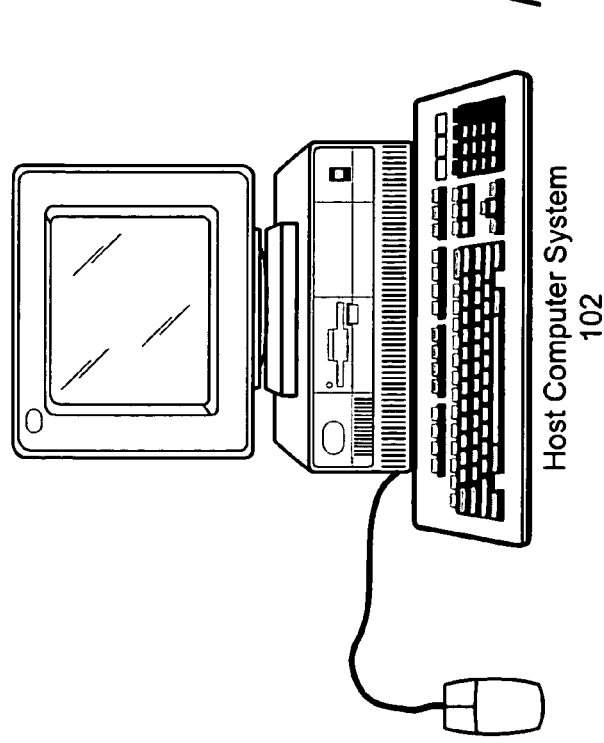
FIG. 1 illustrates a computer system suitable for implementing various embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1—A Computer System

FIG. 1 illustrates a computer system suitable for implementing various embodiments of the present invention. The computer system 102 may store and/or execute a software program which performs the method described with reference to FIGS. 5–6, described below. In one embodiment, the computer system 102 may include a display device, such as a monitor, as well as a chassis and one or more I/O devices, such as a keyboard and/or mouse. However, the computer system may take any of various forms, such as a personal computer, or any type of device which includes a processor that executes instructions from a memory medium, or which includes programmable logic that has been configured to perform the method described in FIG. 6. Exemplary computer systems include a personal computer, mainframe computer, a personal computing device (PDA), television, embedded device, and other systems. Thus, as used herein, the term computer system is intended to encompass any of various devices which include a processor that can execute instructions from a memory medium and/or may include a programmable logic device that can be configured to execute a method or algorithm, such as that described in FIG. 5. Thus, the method of the present invention may be implemented in any of various types of devices and any of various types of applications.

Example measurement system applications where the method described herein may be used include instrumentation systems, telecommunication systems, machine vision systems, simulation and modeling, and any other measurement, e.g., data acquisition, or automation, e.g., control, application where it is desirable to validate parameters from a user. Several exemplary fields of application are described in more detail below.

Distributed I/O for Process Automation

Distributed I/O modules (an example of which is Fieldpoint module 185 in FIG. 3B, described below) are generally used for process automation, including measurement, industrial control, and/or data logging applications which involve diverse arrays of sensors and actuators located centrally or spread over large distances. Distributed I/O modules are typically connected to computers over a computer network. The computer network may be a standard network, such as Ethernet, serial, or wireless, and distributed I/O modules may be placed near sensors and signal sources. These features may offer price and convenience advantages over point-to-point wiring.

Image Acquisition

Image acquisition devices generally provide an interface between cameras and computers. The computer controls how the camera captures the image, such as in single-shot and continuous-mode image acquisitions, and may be used to analyze images acquired by the camera. Image acquisition systems may be used to control manufacturing process, during manufacturing test and inspections, for sorting during manufacturing and shipping, and in security systems, among others.

Motion Control

Motion controllers typically provide an interface between motor drives and computers. A motion control system generally includes the following basic components: a controller, a drive, a motor, and a feedback device. The controller generates a trajectory for the motor to follow and transmits corresponding signals to the drive. The drive then takes the signals sent by the controller and changes them into signals that will actually move the motor. The feedback device is generally used to close the control loop in closed-loop systems. Motion control systems are used to control manufacturing machines, for control of vehicles, for movement of antennas, and in other areas where control of motors is needed.

Industrial Communications

Industrial communication boards allow a user to connect computers to industrial devices such as process instrumentation, PLCs, single-loop controllers, and I/O and data acquisition devices, using any of a number of protocols, e.g., CAN, DeviceNet, FOUNDATION, Fieldbus, PROFIBUS, etc. These systems are generally used in manufacturing and storage, among other applications.

Dynamic System Simulation and Modeling

Simulation systems are available which allow a user to graphically create a block diagram model which models a system, device, or process being designed. A graphical model may comprise a plurality of interconnected blocks, where each block may have one or more parameters. Certain of the parameters may be "tunable", i.e., the user can interactively manipulate values for these parameters during program execution. A model can be deployed on a target processor for execution. Exemplary simulation applications which involve a measurement system include rapid control prototyping and hardware-in-the-loop simulation.

Other applications where the method of the present invention may be used include analysis related to various other types of data, including financial data, stock data, futures data, business data, scientific data, medical data, insurance data, musical data, and biometric data, among others.

Figure 2:
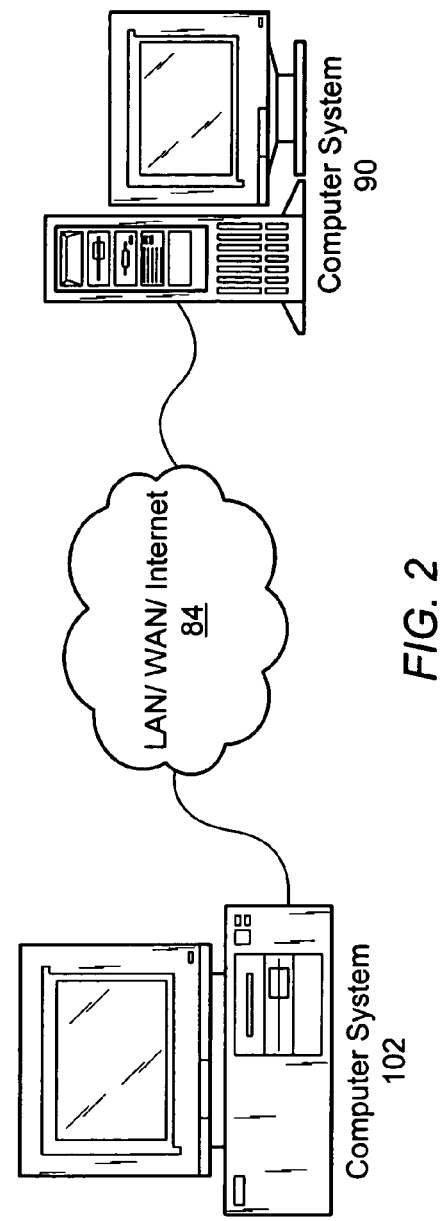
FIG. 2 illustrates an exemplary networked computer system.

FIG. 2—Computer Systems Connected Via a Network

FIG. 2 illustrates an exemplary networked computer system. It is noted that FIG. 2 is exemplary only and that in various embodiments the present invention may be used in any type of system, including a system with only one computer, as well as a system with three or more computers coupled over the network.

FIG. 2 illustrates an exemplary system in which a first computer system 102 is connected through a network 84 to a second computer system 90. The computer systems 102 and 90 can be any of various types, as desired. The network 84 can also be any of various types, including the Internet, a LAN (local area network), or a WAN (wide area network), among others. Additionally, one or more of the networked computer systems may include or be coupled to a measurement device. The system may store and execute application software, such as a graphical or textual program, to perform a measurement or automation task in conjunction with the measurement or automation device, where, as noted above, the term "measurement" is used herein to refer to any type of data or image acquisition, and the term "automation" is used herein to refer to any type of automation or control. The system also preferably stores and executes error reporting software, possibly as part of the application program code, for detecting and reporting invalid parameter values during development or operation of the system. In a preferred embodiment, software according to various embodiments of the present invention may be included in one or more data acquisition libraries, where the data acquisition libraries may be utilized by various systems or applications to perform data acquisition tasks, e.g., for measurement or automation systems or processes.

In various embodiments, the storage and execution of the application software and/or error reporting software may be distributed over the system in different ways. For example, in one embodiment, the application program may be executed by the first computer 102, and a GUI, e.g., one or more dialogs, used to report detected errors (invalid parameter values) may be displayed on a display device of the second computer system 90. Thus, portions of the application software and the error reporting software may be executed on the first computer, the second computer, or may be executed in a distributed fashion over both computer systems. Other distributed processing schemes are also contemplated for execution of the application and error reporting software, such as, for example, so-called "grid-computing" approaches, where the software execution is distributed across numerous networked devices in a manner that may be substantially transparent to a user.

Figure 3A:
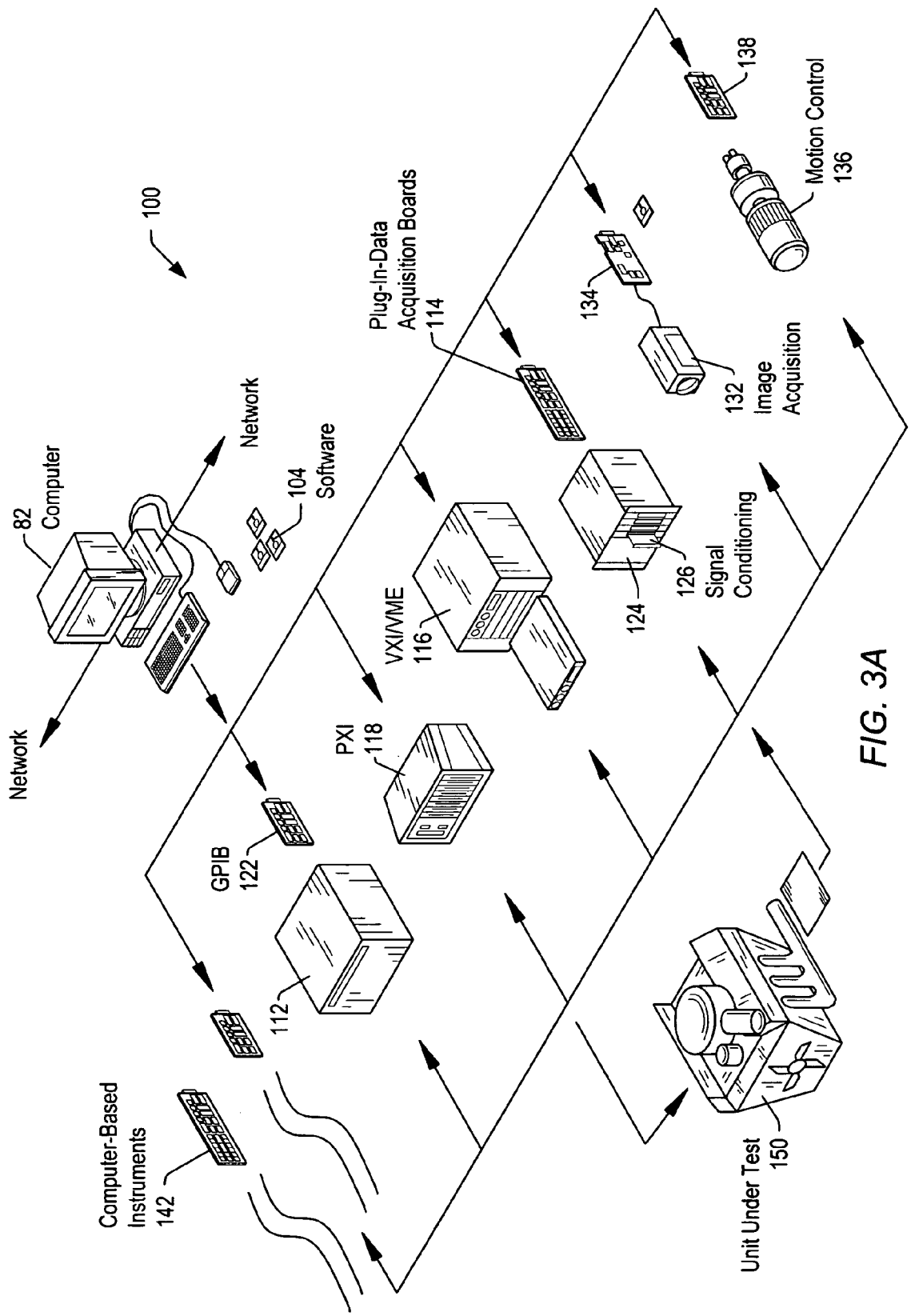
FIGS. 3A and 3B illustrate representative instrumentation and process control systems including various I/O interface options.
Figure 3B:
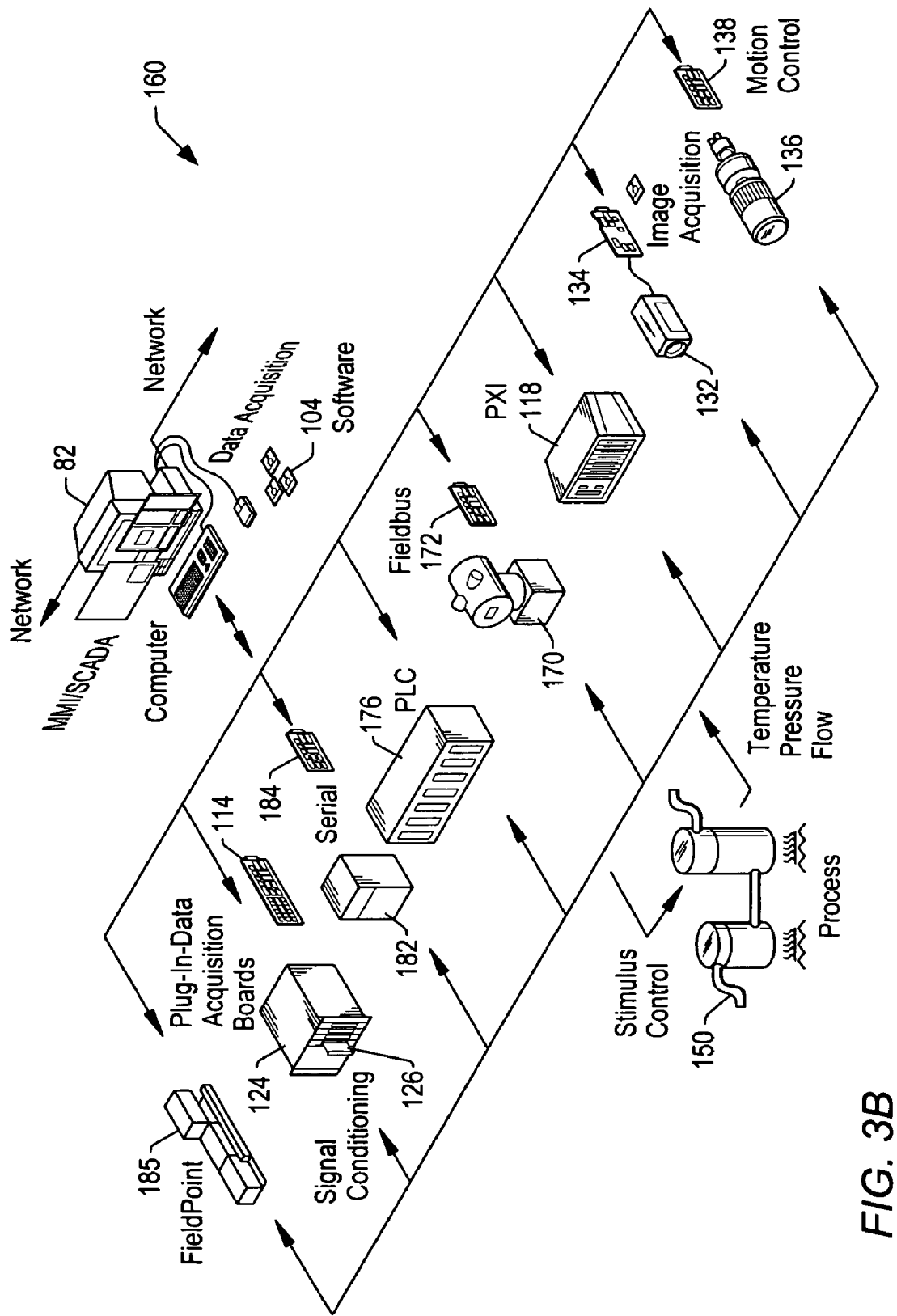

FIGS. 3A and 3B—Instrumentation and Industrial Automation Systems

FIGS. 3A and 3B illustrate an exemplary computer 102 having various types of instruments or hardware devices connected. In various embodiments, the computer 102 may be any of the computers 102 or 90 discussed above. For example, a graphical program element may execute on the computer 102 and may write data acquired from a connected hardware device to a data target. It is noted that FIGS. 3A and 3B are exemplary only, and in alternative embodiments, graphical program elements and/or GUI elements such as described herein may execute on any of various types of systems and may be used in any of various applications.

It is further noted that the present invention can be used for a plethora of applications and is not limited to industrial measurement or industrial automation applications. In other words, the following description is exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc.

FIG. 3A illustrates an instrumentation control system 100. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure, or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application. In other words, the system 100 may be used in any type of application that performs data acquisition, e.g., in a measurement or automation system.

FIG. 3B illustrates an exemplary industrial automation system 160. The industrial automation system 160 is similar to the instrumentation or test and measurement system 100 shown in FIG. 3A. Elements which are similar or identical to elements in FIG. 3A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control that acquires data in its operations.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 3A and 3B, the computer system 102 preferably includes a memory medium on which software according to one embodiment of the present invention is stored. For example, the memory medium may store a program or application that includes a GUI through which a user may interact with the program or application. Also, the memory medium may store an application development environment which utilizes the methods described herein to support the reporting and correction of invalid parameters used in or by the program or application, and/or used in or by a device operating in conjunction with the program or application, such as DAQ board 114, for example.

The term "memory medium" is intended to include an installation medium, e.g., a CD-ROM, floppy disks 104, or tape device, a computer system memory or random access memory such as DRAM, SRAM, EDO RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system, embedded computer, or other device. In general, the term "computer system" can be broadly defined to encompass any device having at least one processor which executes instructions from a memory medium.

Figure 4:
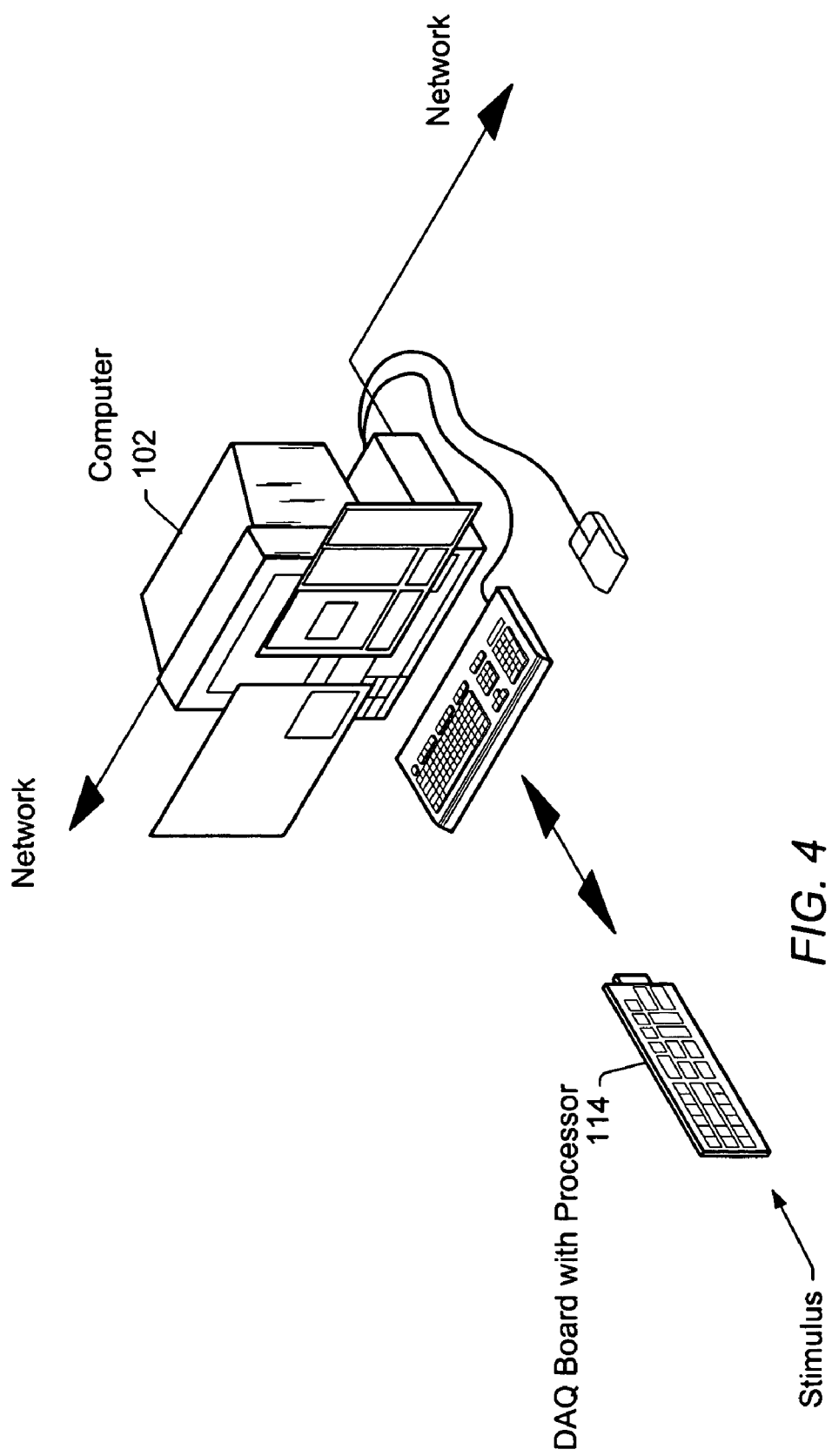
FIG. 4 illustrates an exemplary data acquisition system.

FIG. 4—Data Acquisition System

FIG. 4 illustrates an exemplary data acquisition (DAQ) system suitable for some embodiments of the present invention. As FIG. 4 shows, the computer system 102 may couple to a data acquisition (DAQ) board 114, which may in turn couple to a signal source, here shown as a stimulus. In one embodiment, the computer system 102 may store and execute application software, e.g., a graphical program, to perform a measurement task in conjunction with the DAQ board 114. The computer system 102 may also execute software according to present invention (referred to as error reporting software) to report (and optionally correct) invalid parameter values related to operation of the DAQ system, e.g., values of parameters used by the application software and/or the DAQ board 114, further details of which are presented below with reference to FIGS. 5–8.

In the embodiment shown, the DAQ board 114 includes a processor and memory, and thus, the computer 102 and the board 114 may comprise a motherboard/daughterboard system. In various embodiments, at least a portion of the application software and/or the error reporting software may be executed on the DAQ board 114. For example, in one embodiment, the application program may be executed by the DAQ board 114, but where a GUI, e.g., one or more dialogs, used to report detected errors (invalid parameter values) is displayed on a display device of the computer system 102.

Alternatively, in other embodiments, an instrument may include a processor and memory, as well as a display device, and may operate as a standalone device, i.e., without the computer system 102. In these embodiments, the instrument may store and execute the application software and the error reporting software.

It should be noted that although a DAQ system is shown in FIG. 4, any type of measurement or automation system, including DAQ, IMAQ, and control systems, i;e., any type of system that acquires data to operate, may be suitable for various embodiments of the invention. Additionally, simulation systems related to measurement or automation operations are also contemplated as suitable applications of the present invention. It is further noted that other distributed processing schemes are also contemplated for execution of the application and error reporting software, such as, for example, "grid-computing" approaches, where the software execution is distributed across numerous available devices in a manner that may be substantially transparent to a user, as was mentioned above.

Figure 5:
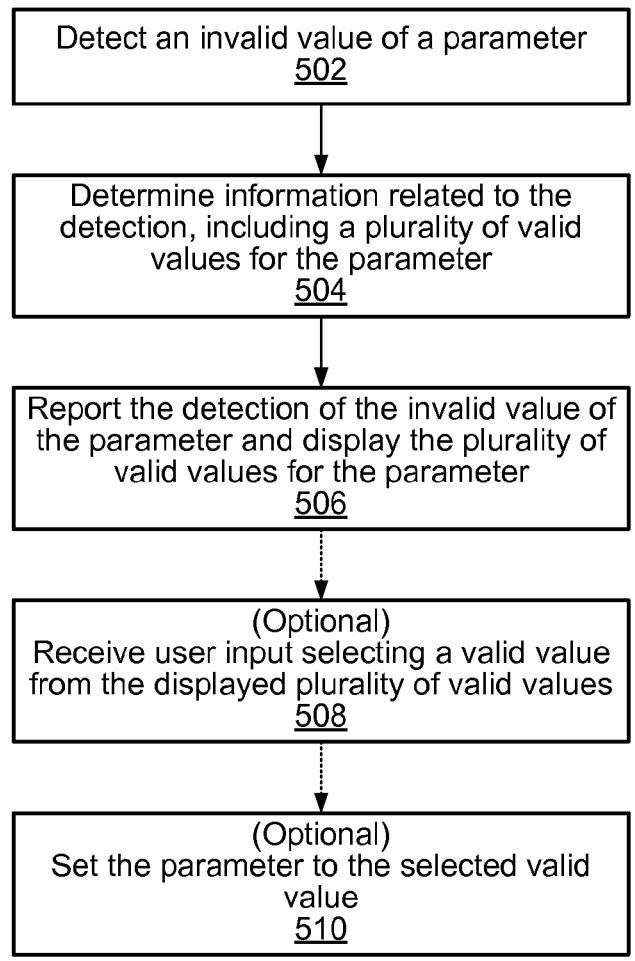
FIG. 5 is a flowchart diagram illustrating one embodiment of a method for automatically configuring communications between a graphical program element and a graphical user interface (GUI) element.

FIG. 5—Method for Reporting Invalid Parameter Values in a Measurement System

FIG. 5 is a flowchart of one embodiment of a method for reporting invalid parameter values, and optionally correcting the values, in a measurement system. It is noted that in various embodiments, some of the steps described may be performed concurrently, in a different order than shown, or omitted. Additional steps may also be performed as desired. It should be noted that various embodiments of the method described herein may be implemented in a graphical programming language, such as the LabVIEW graphical program provided by National Instruments Corporation, in a textual programming language, such as C or Visual Basic, Java (e.g., compilable or interpretable), or a combination of both.

As FIG. 5 shows, in 502, an invalid value of a parameter may be detected, e.g., during the execution of an application program. For example, a parameter used by a textual or graphical program, optionally in conjunction with a device, such as a measurement, automation, and/or control device, may have a value that is outside a specified allowable range, or is otherwise invalid. It is noted that the parameter values may be numeric, alphanumeric, enumerations, or any other type of parameter value.

Once the invalid parameter value is detected in 502, then in 504, information related to the detection may be determined, including one or more valid values for the parameter. It should be noted that in general the valid values for the parameter must be known by the system in order to detect the invalid parameter value, and so may not have to be determined in a separate step. In other words, the determination of the valid values may be considered to be performed as part of 502 above, or may simply involve extracting the values from a data structure used in 502.

In one embodiment, the information related to the detection may also include one or more of: an identifier (ID) of the parameter, such as a mnemonic name or ID number, the invalid value of the parameter, and contextual information related to the detection. In one embodiment, the contextual information may include one or more of: a function ID (e.g., a function name or other identifier) indicating where the detection occurred, a device ID (e.g., a name or other identifier) indicating where the detection occurred, a time value indicating when the detection occurred, and a text description of the parameter, among others. In other words, the contextual information may include any information related to the detection that may be useful to a developer or user in correcting the error.

In 506, the detection of the invalid value of the parameter may be reported, and one or more valid parameter values displayed, where the displayed one or more valid values for the parameter are usable to set the parameter to a valid value. For example, a dialog box (or multiple dialog boxes) may be displayed indicating various details related to the detection, including the determined valid parameter values. As noted above, the parameter values may be numeric, alphanumeric, enumerations, or any other type of parameter value. The one or more valid values for the parameter may be presented in various ways. For example, the valid values may be presented as a list of values or as a range (or multiple allowable ranges) of values.

In one embodiment, reporting the detection of the invalid value of the parameter may include reporting at least a portion of the determined information related to the detection, e.g., one or more of: an identifier (ID) of the parameter, the invalid value of the parameter, and contextual information related to the detection, as indicated above. As also mentioned above, the contextual information may include any information related to the detection that may be useful to the user or developer, including one or more of: a function ID indicating where the detection occurred, a device ID indicating where the detection occurred, a time value indicating when the detection occurred, and a text description of the parameter, among others.

In one embodiment, reporting the detection may include displaying at least a portion of the determined information related to the detection (including the one or more valid parameter values) on a display device, such as, for example, a computer monitor, printer, or other display device.

In another embodiment, reporting the detection of the invalid value of the parameter may include logging at least a portion of the information related to the detection. For example, logging at least a portion of the information related to the detection may include storing said at least a portion of the information related to the detection on a storage medium, and/or and sending said at least a portion of the information related to the detection to an external system over a network.

As FIG. 5 also indicates, in one embodiment, input specifying a new value of the parameter may optionally be received, where the new value is preferably one of the one or more valid values for the parameter, as indicated in 508, and in 510, the parameter set to the new value in response to the input. In other words, in some embodiments, the method may include receiving input indicating a valid value for the parameter, and programmatically setting the parameter to the valid value.

The input may be received in a variety of ways from a variety of sources. For example, in one embodiment, the input may be from an external system, such as from a computer or other device via a network. Alternatively, the input may be received from a sub-system of the measurement system, for example, from a program function or, in the case that the application is a graphical program, from a graphical program element, e.g., a node. For example, if the parameter is associated with a graphical program node in the graphical program, the graphical program node may be coupled to (e.g., "wired to") another graphical program element that may export the value of the parameter to the graphical program node. In response to the reported invalid parameter value, the user may edit or other modify the graphical program element (or related programming code) such that a valid value of the parameter will be exported to the graphical program node.

In other embodiments, the input may comprise user input. In various embodiments, the user may invoke presentation of a data field (i.e., a text or numeric entry field), e.g., via a menu, right-clicking on the display, etc., where the data field is operable to receive user input specifying a replacement value for the parameter. User input may then be received by the data field specifying the new value for the parameter. In an embodiment where the application is a graphical program, for example, the user may right-click on a property node (or its equivalent), thereby invoking a selection or input mechanism, such as a list, data field, menu, etc., and specify the value of the parameter. The parameter may then be set to the specified value.

Alternatively, the display of the one or more valid parameter values may include one or more active controls, e.g., entry fields, radio buttons, selectable lists, etc., displayed in a dialog box or panel allowing the user to specify the valid value by interacting with the display. In other words, receiving user input specifying the new value of the parameter may include receiving user input selecting the new value from the displayed one or more valid values for the parameter. In response to the user selection of the valid value, the parameter may be set to that value.

In one embodiment, once the user (or other input source) has specified the replacement value for the parameter, the method may determine whether the new value is a valid parameter value. If the new value is invalid, the method may repeat, proceeding as described above, until a valid parameter value is specified, and the parameter set to that value.

Thus, various embodiments of the method described above may operate to report invalid parameter values for a measurement system, presenting valid values of the parameter, and may optionally provide means for setting the parameter to a specified valid value. Examples of error reports according to various embodiments of the present invention are provided below with reference to FIGS. 7A and 7B, and contrasted with a prior art approach represented in FIG. 6, described below.

Figure 6:
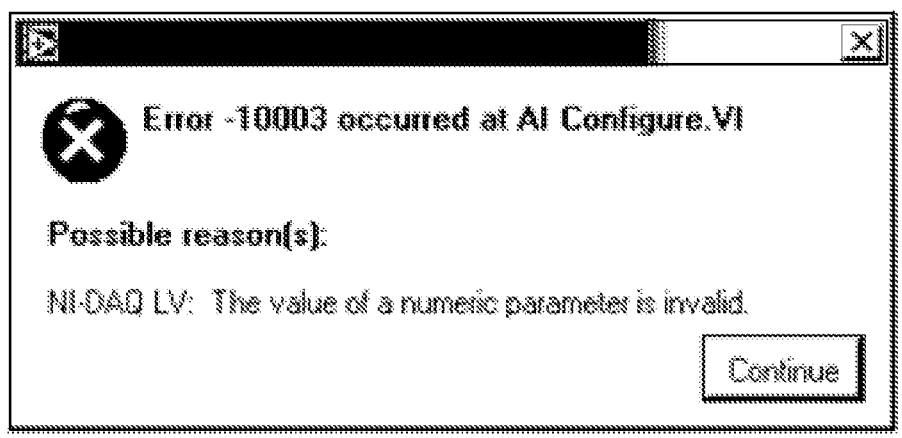
FIG. 6 illustrates a dialog box for error reporting, according to the prior art.

FIG. 6—Prior Art Error Report

FIG. 6 illustrates an example of an error report, according to the prior art. As FIG. 6 shows, in this example, a dialog is presented indicating an error identifier (ID) (in this case, Error—10003), as well as the function (in this case, a Virtual Instrument (VI) in a graphical program under National Instruments Corporation's LabVIEW) where the detection occurred, and a brief description of the error—an invalid numeric parameter value. Thus, in this example, neither the parameter name nor the invalid value is reported, possibly requiring the user to further debug the program and/or consult various technical references or technical support to determine further details regarding the error.

Figure 7A:
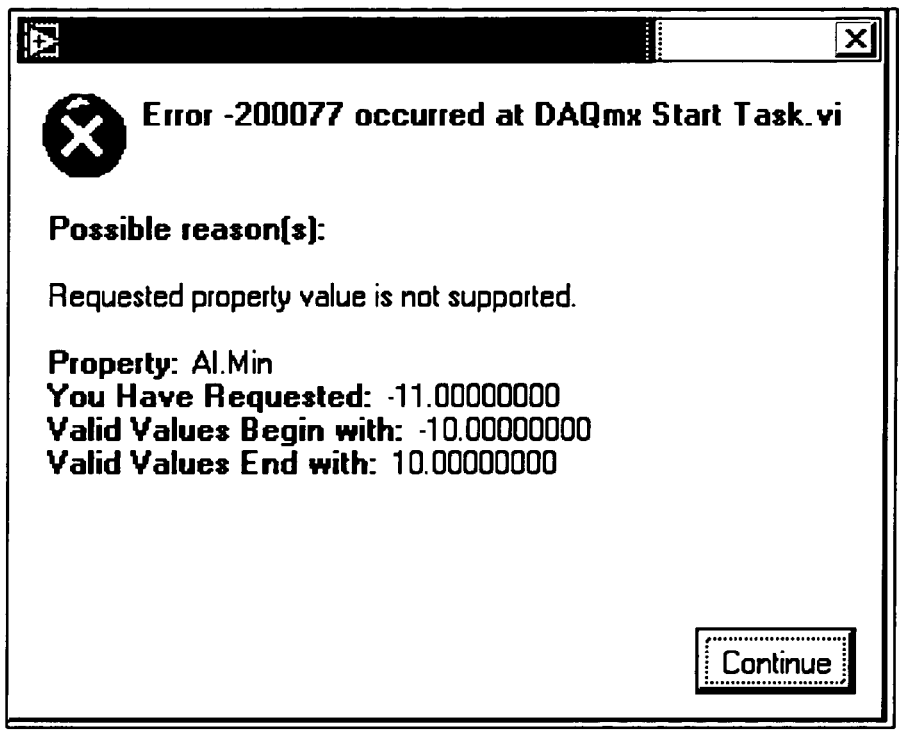
FIGS. 7A and 7B illustrate exemplary dialog boxes for reporting invalid parameter values and indicating valid values for the parameter, according to one embodiment.
Figure 7B:
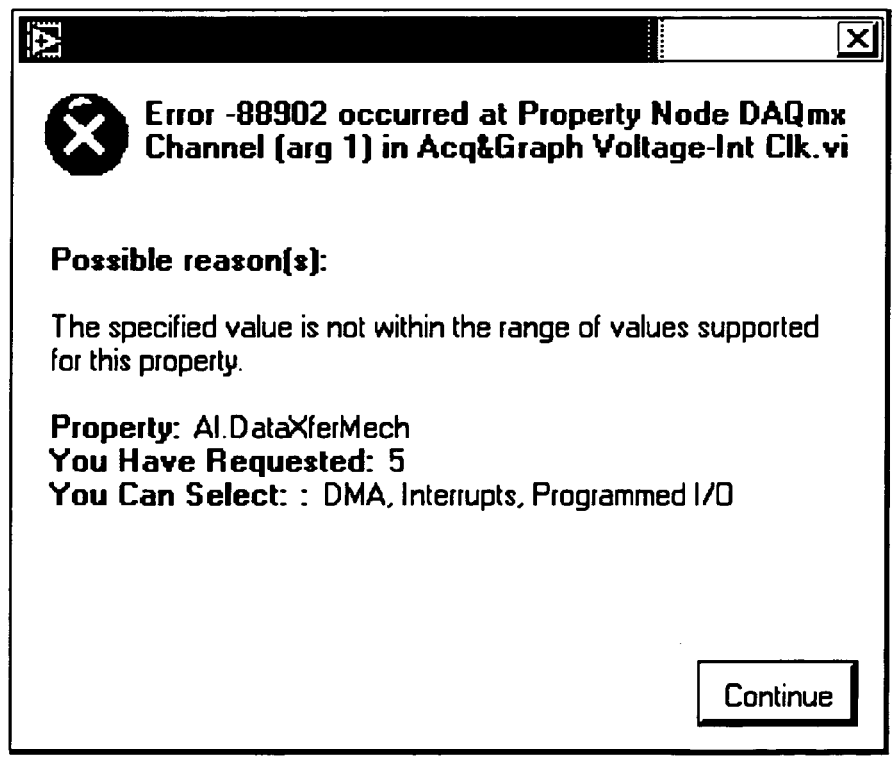

FIGS. 7A and 7B—Error Reports with Additional Information

FIGS. 7A and 7B illustrate error reporting according to various embodiments of the present invention. In both examples shown, in addition to the information presented above in the prior art example of FIG. 6, i.e., error ID, function (VI) where the error occurred, and brief description of the error, additional information is provided regarding the invalid parameter value. For example, in the error report of FIG. 7A, error ID −200077 is reported to have occurred in the VI DAQmx Start Task.vi, and a brief text description indicating that a requested parameter value is not supported (i.e., is invalid). The additional information provided includes the name of the parameter (AI.Min), the invalid parameter value (−11.00000000), and the range of valid values for the parameter (−10.00000000–10.000000). Thus, a user is provided the information needed to correct the invalid parameter value, e.g., to replace the invalid value with a valid value in the specified range. An example program that uses the error report of FIG. 7A is described below and illustrated in FIG. 8.

In the error report of FIG. 7B, in addition to the error ID (-88902), location (at Property Node DAQmx Channel (arg 1) in Acq&Graph Voltage-Int Clk.vi), and brief description of the error (that the specified value is not in a valid range for the parameter), the name of the parameter is given (AI.DataXferMech), as well as the invalid parameter value (5), and a list of valid parameter values (DMA, Interrupts, Programmed I/O). Thus, the additional information may facilitate the user correcting the invalid parameter without having to refer to technical reference and/or consult technical support.

As mentioned above, in some embodiments, the error report may include means for correcting the invalid parameter value. For example, one or more controls may be presented to the user whereby a valid value may be entered or specified, such as, for example, a numeric or text entry field, a pop-up menu listing (selectable) valid values, radio buttons providing valid selections for the parameter value, and so forth. User input may be received to or by the one or more controls specifying the new value, and the parameter set to that value.

Figure 8:
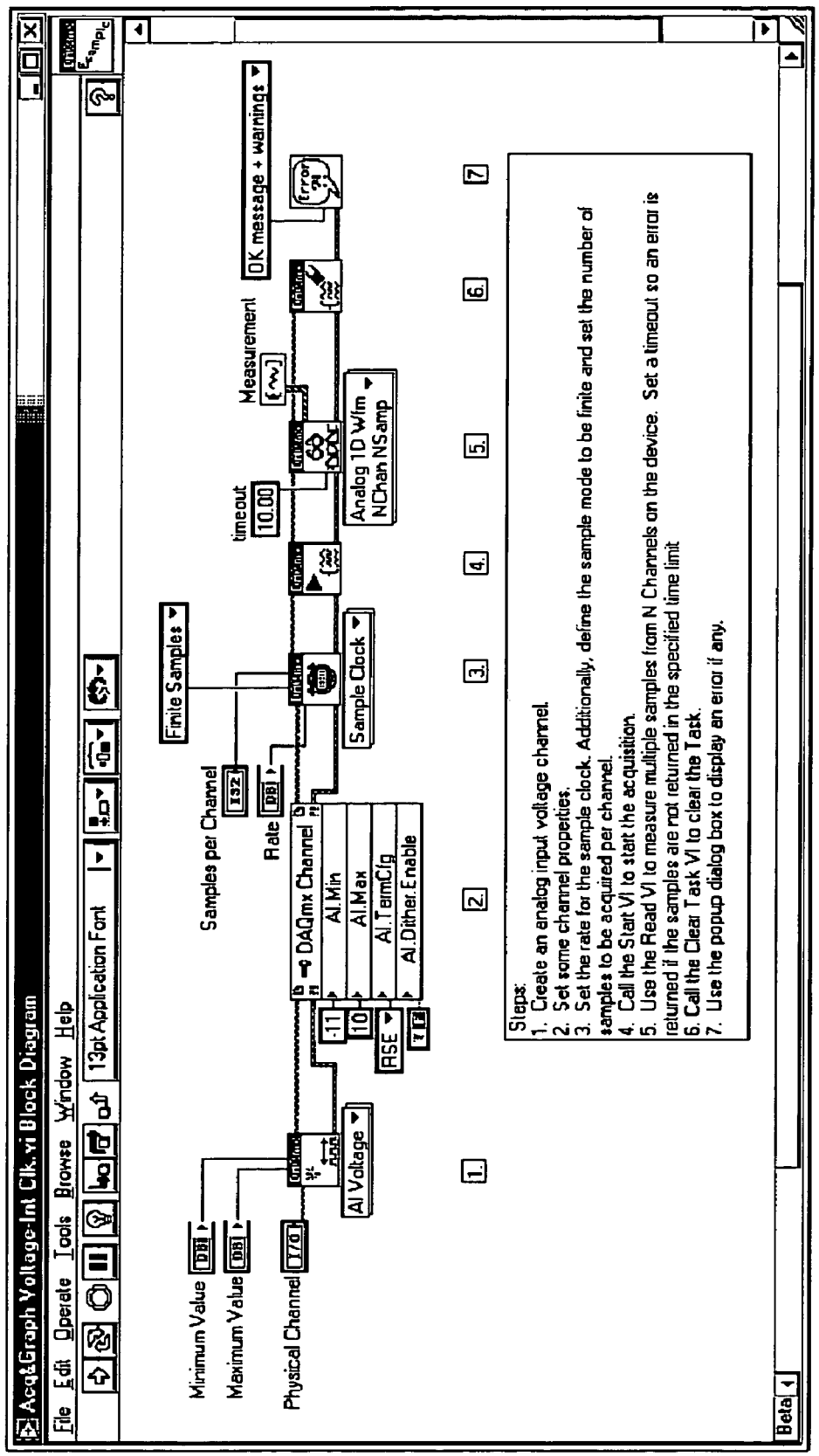
FIG. 8 illustrates a block diagram of a graphical program with error reporting, according to one embodiment of the present invention.

FIG. 8—Example Graphical Program with Error Reporting

FIG. 8 is a block diagram of an exemplary graphical program created using National Instruments LabVIEW graphical programming environment that implements one embodiment of the present invention, where the graphical program is designed to perform a specified task. This example program controls a data acquisition board so that the board acquires a finite amount of analog voltage data using the board's internal sample clock. As noted above, VI refers to a Virtual Instrument (e.g., a graphical program node). Virtual Instruments are building blocks used in LabVIEW programs.

As FIG. 8 shows, this program is operable to create an analog input voltage channel, and set properties of the analog input voltage channel to suit the application's particular needs, performed by VIs or nodes indicated by '1.' and '2.', respectively. The program also sets the rate for the sample clock, defines the sample mode to be finite, and set the number of samples to be acquired per channel via the Sample Clock VI indicated by '3.'.

As FIG. 8 also shows, the program operates to call a Start VI, indicated by '4.', to begin the acquisition, and uses a Read VI, indicated by '5.', to measure multiple samples from N Channels on the device, and to set a timeout so that an error is returned if the samples are not returned in the specified time limit. A Clear Task VI, indicated by '6.', is then called to clear the task. Finally, the program is operable to use a popup dialog box to display an error if any occurs, via an Error Reporting VI, indicated by '7.'.

When the program shown in FIG. 8 is executed, the error message from FIG. 7A is generated, enabling the programmer to easily locate the source of error in the diagram (see '2.' of FIG. 8).

Thus, various embodiments of the present invention may be implemented using graphical programming techniques, although other programming techniques are also contemplated, including compilable and interpretable text-based programs.

Thus, various embodiments of the system and method presented above may allow a user to not only receive error reports indicating detection of an invalid parameter, but may also inform the user as to what parameter values are valid. Additionally, mechanisms may optionally be provided that facilitate setting the parameter to a valid value.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A computer-implemented method for reporting an invalid parameter value in a measurement or automation system, the method comprising:

detecting an invalid value of a parameter of the measurement or automation system;

determining information related to the detection, including a plurality of valid values for the parameter, wherein the information related to the detection further comprises contextual information related to the detection, comprising:

a function ID indicating where the detection occurred; and a device ID indicating where the detection occurred;

reporting the detection of the invalid value of the parameter;

displaying the plurality of valid values for the parameter, wherein the displayed plurality of valid values for the parameter are usable to set the parameter to a valid value;

receiving user input selecting a valid value from the displayed plurality of valid values for the parameter; and setting the parameter to the selected valid values in response to the user input.

2. The method of claim 1, wherein said information related to the detection further comprises one or more of:

an identifier (ID) of the parameter; or the invalid value of the parameter.

3. The method of claim 2, wherein said contextual information further comprises one or more of:

an error ID identifying an error corresponding to the detection;

a time value indicating when the detection occurred;

a text description of the error corresponding to the detection; or a text description of the parameter.

4. The method of claim 1, wherein said reporting the detection of the invalid value of the parameter comprises reporting one or more of:

an identifier (ID) of the parameter;

the invalid value of the parameter; or contextual information related to the detection.

5. The method of claim 4, wherein said contextual information comprises one or more of:

an error ID identifying an error corresponding to the detection;

a function ID indicating where the detection occurred;

a device ID indicating where the detection occurred;

a time value indicating when the detection occurred;

a text description of the error corresponding to the detection; or a text description of the parameter.

6. The method of claim 1, wherein said reporting the detection of the invalid value of the parameter and said displaying the plurality of valid values for the parameter comprises:

displaying at least a portion of said information related to the detection on a computer display device.

7. The method of claim 1, wherein said reporting the detection of the invalid value of the parameter comprises:

logging at least a portion of the information related to the detection.

8. The method of claim 7, wherein said logging at least a portion of the information related to the detection comprises one or more of:

storing said at least a portion of the information related to the detection on a storage medium; or sending said at least a portion of the information related to the detection to an external system over a network.

9. The method of claim 1, wherein said displaying the plurality of valid values for the parameter comprises:

displaying a range of valid values for the parameter.

10. The method of claim 1, wherein the method is implemented in a graphical programming language.

11. The method of claim 1, wherein the method is implemented in a textual programming language.

12. The method of claim 1, wherein at least a portion of said detecting, and said determining information is performed on an embedded device; and wherein at least a portion of said reporting the detection and said displaying the plurality of valid values for the parameter is performed on an external system coupled to the embedded device.

13. The method of claim 1, wherein the measurement or automation system comprises a data acquisition (DAQ) system.

14. The method of claim 13, wherein said detecting, said determining, said reporting, and said displaying are performed by functions implemented in a DAQ library.

15. The method of claim 1, wherein the measurement or automation system comprises an image acquisition (IMAQ) system.

16. The method of claim 1, wherein the measurement or automation system comprises an industrial automation system.

17. The method of claim 1, wherein the measurement or automation system comprises an industrial control system.

18. The method of claim 1, wherein the measurement or automation system comprises an industrial communication system.

19. A system for reporting invalid parameter values in a measurement or automation system, the system comprising:

a processor;

a memory medium coupled to the processor, wherein the memory medium stores a program instructions which are executable by the processor to:

detect an invalid value of a parameter;

determine information related to the detection, including plurality of valid values for the parameter, wherein the information related to the detection further comprises contextual information related to the detection, comprising:

a function ID indicating where the detection occurred; and a device ID indicating where the detection occurred;

report the detection of the invalid value of the parameter;

display the plurality of valid values for the parameter, wherein the displayed plurality of valid values for the parameter are usable to set the parameter to a valid value;

receive user input selecting a valid value from the displayed plurality of valid values for the parameter; and set the parameter to the selected valid value in response to the user input.

20. A system for reporting invalid parameter values in a measurement or automation system, the system comprising:

means for detecting an invalid value of a parameter;

means for determining information related to the detection, including plurality of valid values for the parameter, wherein the information related to the detection further comprises contextual information related to the detection, comprising:

a function ID indicating where the detection occurred; and a device ID indicating where the detection occurred;

means for reporting the detection of the invalid value of the parameter;

means for displaying the plurality of valid values for the parameter, wherein the displayed plurality of valid values for the parameter are usable to set the parameter to a valid value;

means for receiving user input selecting a valid value from the displayed plurality of valid values for the parameter; and means for setting the parameter to the selected valid value in response to the user input.

21. A computer readable memory medium which stores program instructions for reporting invalid parameter values in a measurement or automation system, wherein the program instructions are executable by a processor to perform:
  detecting an invalid value of a parameter;
  determining information related to the detection, including plurality of valid values for the parameter, wherein the information related to the detection further comprises contextual information related to the detection, comprising:
    a function ID indicating where the detection occurred; and
    a device ID indicating where the detection occurred;
  reporting the detection of the invalid value of the parameter;
  displaying the plurality of valid values for the parameter, wherein the displayed plurality of valid values for the parameter are usable to set the parameter to a valid value;
  receiving user input selecting a valid value from the displayed plurality of valid values for the parameter; and
  setting the parameter to the selected valid value in response to the user input.

22. A computer-implemented method for reporting an invalid parameter value in a data acquisition system, the method comprising:
  detecting an invalid value of a parameter in a program comprised in the data acquisition system;
  determining information related to the detection, including plurality of valid values for the parameter, wherein the information related to the detection further comprises contextual information related to the detection, comprising:
    a function ID indicating where the detection occurred; and
    a device ID indicating where the detection occurred;
  reporting the detection of the invalid value of the parameter;
  displaying the plurality of valid values for the parameter, wherein the displayed plurality of valid values for the parameter are usable to set the parameter to a valid value;
  receiving user input selecting a new value from the displayed plurality of valid values for the parameter; and
  setting the parameter to the new value in response to the user input.

23. The method of claim 21, wherein said detecting, said determining, said reporting, and said displaying are performed by functions implemented in a data acquisition library.

24. A computer readable memory medium comprising program instructions for reporting an invalid parameter value in a simulation system, wherein the program instructions are executable to implement:
  detecting an invalid value of a parameter of a model in the simulation system;
  determining information related to the detection, including plurality of valid values for the parameter, wherein the information related to the detection further comprises contextual information related to the detection, comprising:
    a function ID indicating where the detection occurred; and
    a device ID indicating where the detection occurred;
  reporting the detection of the invalid value of the parameter;
  displaying the plurality of valid values for the parameter, wherein the displayed plurality of valid values for the parameter are usable to set the parameter to a valid value in the model;
  receiving user input selecting a new value from the displayed plurality of valid values for the parameter; and
  setting the parameter to the new value in response to the user input.

* * * * *